United States Patent [19]

Koyama et al.

[11] Patent Number: 5,071,723
[45] Date of Patent: Dec. 10, 1991

[54] ELECTROPHOTOGRAPHIC PHOTOSENSITIVE MEMBER WITH GRAFTED POLYAMIDE INTERLAYER

[75] Inventors: Takashi Koyama; Hideki Anayama, both of Kanagawa; Yuichi Hashimoto, Tokyo, all of Japan

[73] Assignee: Canon Kabushiki Kaisha, Tokyo, Japan

[21] Appl. No.: 552,115

[22] Filed: Jul. 13, 1990

[30] Foreign Application Priority Data

Jul. 13, 1989 [JP] Japan .................................. 1-182024

[51] Int. Cl.$^5$ ...................... G03G 5/047; G03G 5/14; G03G 15/00; H04N 1/23
[52] U.S. Cl. .......................................... 430/58; 430/60; 430/62; 430/64; 355/211; 358/300
[58] Field of Search .................... 430/58, 60, 62, 64

[56] References Cited

U.S. PATENT DOCUMENTS

| | | | |
|---|---|---|---|
| 3,634,079 | 1/1972 | Champ et al. | 430/64 X |
| 4,495,263 | 1/1985 | van der Valk | 430/60 |

FOREIGN PATENT DOCUMENTS

| | | | |
|---|---|---|---|
| 11586 | 3/1974 | Japan | 430/60 |
| 4152 | 1/1981 | Japan | 430/64 |
| 95351 | 6/1983 | Japan | 430/60 |
| 66258 | 4/1985 | Japan | 430/60 |
| 178970 | 7/1989 | Japan | 430/60 |
| 282561 | 11/1989 | Japan | 430/60 |

*Primary Examiner*—Roland Martin
*Attorney, Agent, or Firm*—Fitzpatrick, Cella, Harper & Scinto

[57] ABSTRACT

An electrophotographic photosensitive member has a substrate, a photosensitive layer and an intermediate layer spaced between said substrate and said photosensitive layer. The intermediate layer contains a polyamide resin grafted with a polymer or a copolymer having a unit component expressed by the following general formula (I)

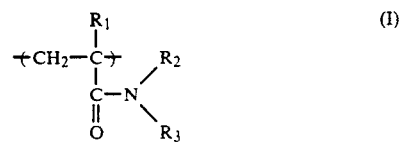

wherein, $R_1$ is hydrogen atom or a methyl group, each of $R_2$ and $R_3$ is a hydrogen atom, an alkyl group or an aryl group or $R_2$ and $R_3$ in combination is a residual group necessary for forming a heterocyclic compound containing N, $R_2$ and $R_3$ are the same or different from each other. Also disclosed are an electrophotographic apparatus having the photosensitive member, and a facsimile incorporating the electrophotographic apparatus.

11 Claims, 2 Drawing Sheets

ELECTROPHOTOGRAPHIC PHOTOSENSITIVE MEMBER WITH GRAFTED POLYAMIDE INTERLAYER

BACKGROUND OF THE INVENTION

1. Field of the Invention

The present invention relates to an electrophotographic photosensitive member and, more particularly, an U electrophotographic photosensitive member having an improved intermediate layer provided between a substrate and a photosensitive layer.

2. Description of the Related Art

One of the significant requirements for an electrophotographic photosensitive member is that it possesses satisfactory charging characteristics, such as stability of dark and bright potentials against repeated charging-exposure cycles, uniformity of sensitivity and the like.

Therefore, it has been proposed to provide an intermediate layer or layers having various functions between the substrate and the photosensitive layer: such intermediate layers include a barrier layer which prevents injection of charges from the substrate into the photosensitive layer, a bonding layer for improving the strength of bonding between the substrate and the photosensitive layer, and a cladding layer having a cladding function to cover any defect in the substrate for the purpose of obtaining a photosensitive layer of uniform thickness.

For instance, hitherto, intermediate layers of the following materials have been proposed in the following Japanese Unexamined Patent Publications: polyamide (Japanese Unexamined Patent Publication Nos. 46-47344 and 52-25638); polyester (Japanese Unexamined Patent Publication Nos. 52-20836 and 54-26738); polyurethane (Japanese Unexamined Patent Publication Nos. 49-10044 and 53-89435); casein (Japanese Unexamined Patent Publication No. 55-103556); polypeptide (Japanese Unexamined Patent Publication No. 53-48523); polyvinyl alcohol (Japanese Unexamined Patent Publication No. 52-100240); polyvinyl pyrrolidone (Japanese Unexamined Patent Publication No. 48-30936);vinyl acetate-ethylene copolymer (Japanese Unexamined Patent Publication No. 48-26141); maleic anhydride ester copolymer (Japanese Unexamined Patent Publication No. 52-10138); polyvinyl butyral (Japanese Unexamined Patent Publication Nos. 57-90639 and 58-106549); polymer containing tetra ammonium salt (Japanese Unexamined Patent Publication Nos. 51-126149 and 56-60448); and ethyl cellulose ((Japanese Unexamined Patent Publication No. 55-143564).

However, these known electrophotographic photosensitive members having intermediate layers of the above-mentioned materials could not provide stable potential characteristics and image quality over a wide environmental condition including low-temperature and low-humidity condition and high-temperature and high-humidity condition, because the electrical resistance of the intermediate layer significantly varies according to the temperature and humidity.

For instance, when the photosensitive member is used repeatedly in an environment of low temperature and low humidity in which the intermediate layer exhibits a greater resistance, the bright potential and the residual potential rises due to the presence of residual charges on the intermediate layer, with the result that fog is generated on the copied image. When such a photosensitive member is used in an electrophotographic printer which employs inversion development, the density of the image is reduced or the quality of copies fluctuates undesirably.

When this type of photosensitive member is used in an environment of high temperature and high humidity, the barrier function is impaired due to a change in the resistance of the intermediate layer so that the injection of carriers from the substrate is enhanced, which reduces the bright potential. Consequently, the thickness or density of the copy image is reduced at high temperature and humidity. When such a photosensitive member is used in an electrophotographic printer which utilizes inversion development, the copy images tend to be impaired by black spots and fog.

SUMMARY OF THE INVENTION

Accordingly, an object of the present invention is to provide an electrophotographic photosensitive member which exhibits stable potential characteristics and copy image quality over entire environmental conditions of various temperature and humidity levels.

Another object of the present invention is to provide an electrophotographic photosensitive member having an intermediate layer which can satisfactorily cover any defect in the substrate so as to ensure a good quality of copy image without any problem.

To these ends, according to the present invention, there is provided an electrophotographic photosensitive member comprising a substrate, a photosensitive layer and an intermediate layer spaced between the substrate and the photosensitive layer, wherein the intermediate layer contains a polyamide resin grafted with a polymer or a copolymer having a unit component represented by the following general formula (I)

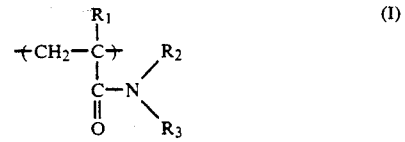

wherein, $R_1$ is hydrogen atom or a methyl group, while each of $R_2$ and $R_3$ is hydrogen atom, an alkyl group or an aryl group or $R_2$ and $R_3$, in combination is a residual group necessary for forming a heterocyclic compound containing N, wherein $R_2$ and $R_3$ are the same or different from each other.

The above and other objects, features and advantages of the present invention will become clear from the following description of the preferred embodiments when the same is read in conjunction with the accompanying drawings.

DETAILED DESCRIPTION OF THE INVENTION

Figure 1:
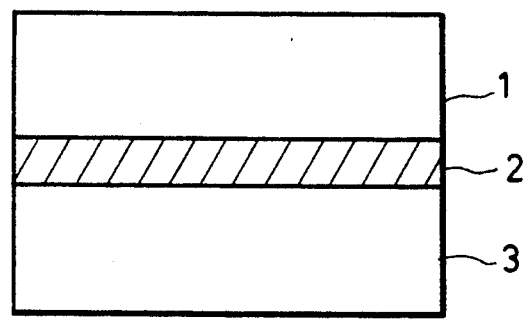
FIG. 1 is an illustration of an example of the layered structure of an electrophotographic photosensitive member according to the present invention.

In the general formula (I), examples of the N-containing heterocycle formed by $R_2$ and $R_3$ are pyrrolidone, piperidine, morpholine, thiazolidine and pyrrolidone.

The grafted polyamide resin used in the invention is synthesized by grafting a polyamide resin used as the principal chain with a polymer or a copolymer having a unit component expressed by the general formula (I) through a polymeric reaction.

More particularly, the chain-forming polyamide resin used in the present invention is well-known to the prior art and includes the semi-crystalline and amorphous resins having a molecular weight on the order of at least about 5,000 and commonly referred to as nylons. In general, polyamides which can be employed in the present invention includes those described in U.S. Pat. Nos. 2,071,250; 2,071,251; 2,130,523; 2,130,948; 2,241,322; 2,312,966; 2,512,606; and 3,393,210. The polyamide resins can also be prepared by condensing equimolar amounts of a saturated dicarboxylic acid having from 4 to 12 carbon atoms, with a diamine containing from about 4 to 12 carbon atoms.

Examples of typical polyamides (nylons) includes polyhexamethylene adipamide (nylon-6,6); polyhexamethylene azelamide (nylon-6,9); polyhexamethylene sebacamide (nylon-6, 19); polyhexamethylene dodecamide (nylon-6, 12); polyamides produced by the ring opening of lactams, namely, poly-caprolactam and poly-laurylactam; poly-11-aminoundecanoic acid; and poly-bis-(para-aminocyclohexyl)-methane dodecanamide. In the present invention it is also possible to use polyamides prepared by the copolymerization of two of the above polymers or by the terpolymerization of the above polymers or their constituents, for example, a copolymer of adipic acid, isophthalic acid and hexamethylene diamine. Preferably, the polyamides employed are linear.

Examples of the polyamide resin usable as the principal skeletal chain of the grafted polyamide used in the present invention are: nylon resins, such as nylon 6, nylon 11, nylon 12, nylon 6,6 and nylon 6,10; copolymer nylon resins containing above-mentioned components; N-alkoxy-methylated nylon resin or N-alkylated nylon resin; nylon resins containing aromatic components and so forth.

The component constituting the graft side chain may be a polymer having the unit component of the formula (I) alone or a copolymer of this polymer with another copolymerizable compound. The content of the unit component of the general formula (I) in the graft side chain is preferably 50 mol % or greater and more preferably 70 mol % or greater.

It is also preferred that the content of the grafted portion of the grafted polyamide resin ranges between 10 and 70 wt %, more preferably 15 to 50 wt %.

The grafted polyamide used in the present invention can be used after being subjected to cross-linking reaction. Cross-linking reduces the solubility of the polyamide which is important when a coating solution of photosensitive material for application is formed for application to the intermediate layers. Usually, the cross-linking is effected by a heat-treatment after formation of the photosensitive layer, by using, for example, an epoxy compound and melamine compound. When an N-alkoxymethylated nylon resin is used as the polyamide component, the cross-linking can be realized by the self-cross-linking effect with the help of an acidic catalyst such as citric acid, adipic acid, tartaric acid, maleic acid and hypophosphorous acid, without using any cross-linker.

Examples of the principal chain component of the polyamide resin used in the invention are:

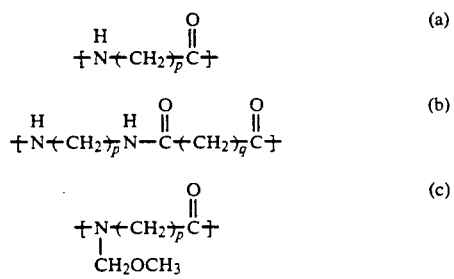

where, p and q are positive integers.

Practical examples of the polymers and copolymers having these compositions as the unit component are shown in Table 1.

TABLE 1

| Components | Names of resins | Mean molecular weight | Remarks |
|---|---|---|---|
| I) | nylon 6 | 105,000 | |
| II) | copolymer nylon 6,6-6,6-10 | 180,000 | Composition ratio (weight ratio) 6/6-6/6-10 = 1/1/1 |
| III) | copolymer nylon 6, 12,6-6,6-10 | 140,000 | Composition ratio 6/12/6-6/6-10 = 2/1/2/2 |
| IV) | N-methoxy-methylated nylon 6 | 260,000 | Methoxymethyl substitution ratio 28 mol % |

Examples of grafted polyamide resin actually used in the invention are shown below.

| Resins | (Main Chain) Polyamide resin | (Side Chain) Graft portion | content of graft portion (wt %) |
|---|---|---|---|
| 1 | I) | | 32 |
| 2 | II) | $+CH_2-C+$ with H and $C-NH_2$ (=O) substituents | 27 |
| 3 | III) | | 35 |
| 4 | IV) | | 31 |

| Resins | (Main Chain) Polyamide resin | (Side Chain) Graft portion | content of graft portion (wt %) |
|---|---|---|---|
| 5 | I) | ![-CH2-C(CH3)(C(=O)NH2)-] | 24 |
| 6 | II) | | 36 |
| 7 | III) | | 28 |
| 8 | IV) | | 25 |
| 9 | I) | ![-CH2-CH(C(=O)N(CH3)2)-] | 41 |
| 10 | II) | | 36 |
| 11 | III) | | 36 |
| 12 | IV) | | 39 |
| 13 | I) | ![-CH2-C(CH3)(C(=O)N(C2H5)2)-] | 17 |
| 14 | II) | | 21 |
| 15 | III) | | 23 |
| 16 | IV) | | 18 |
| 17 | I) | ![-CH2-CH(C(=O)N(H)(CH3))-] | 44 |
| 18 | II) | | 46 |
| 19 | III) | | 37 |
| 20 | IV) | | 24 |
| 21 | I) | ![-CH2-C(CH3)(C(=O)N-pyrrolidinyl)-] | 32 |
| 22 | II) | | 29 |
| 23 | III) | | 34 |
| 24 | IV) | | 32 |
| 25 | I) | ![-CH2-CH(C(=O)N(CH2CCl3)2)-] | 15 |
| 26 | II) | | 12 |
| 27 | III) | ![-CH2-C(CH3)(C(=O)N(CH3)(Ph))-] | 20 |
| 28 | IV) | | 17 |
| 29 | II) | ![-CH2-CH(C(=O)N(4-MeOC6H4)2)-] | 16 |
| 30 | IV) | | 15 |
| 31 | III) | ![-CH2-CH(C(=O)N-morpholinyl)-] | 23 |
| 32 | IV) | | 26 |

-continued

| Resins | (Main Chain) Polyamide resin | (Side Chain) Graft portion | content of graft portion (wt %) |
|---|---|---|---|
| 33 | III) | 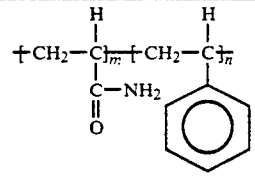<br>m:n = 8:2 (mol ratio) | 18 |
| 34 | III) | 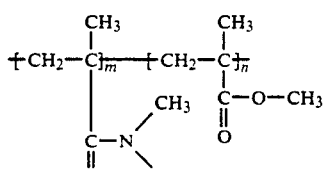<br>m:n = 5:5 (mol ratio) | 21 |
| 35 | IV) | 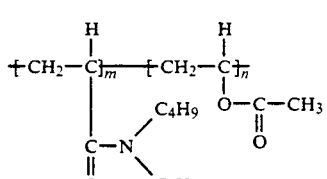<br>m:n = 7:3 (mol ratio) | 33 |
| 36 | IV) | 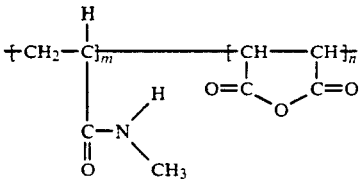<br>m:n = 9:1 (mol ratio) | 14 |

The grafted polyamide resin used in the present invention exhibits a very small change in the volumetric resistance in response to a change in the environmental condition, so that an electrophotographic photosensitive member using this resin as the main material of the intermediate layer exhibits a highly stable potential characteristic. Although not theoretically determined, the very small fluctuation of characteristics of the grafted polyamide resin against change in environmental conditions is attributed to the following factors:

(1) The grafted polyamide resin is easier to form into an amorphous and network structure as compared with a linear polymer. when the photosensitive film is formed by application of a solution, by virtue of the presence of the graft chains. The amorphous network structure can satisfactorily retain both water and ions held in the structure.

(2) Water and ionized substances can be absorbed easily by the polar groups of the graft portions.

For these two reasons, the rise in the resistance can be avoided even under conditions of low temperature and low humidity, while the amorphous network structure effectively prevents invasion of excessive water molecules into the inside of the film so that drastic reduction in the resistance can be avoided even under high temperature and high humidity conditions.

The grafted polyamide resin used in the present invention is formed by grafting the polyamide resin as the principal chain with a monomer equivalent to the unit component expressed by the formula (I) through a polymeric reaction. Although there is no restriction in the kind of the polyamide resin as the principal chain, it is essential that the polymerization is effected on the graft portions.

In general, a methyl or methylene group adjacent to the nitrogen (N) atom of an amide bond exhibits a considerably high degree of activity and, hence, is liable to become radical. Therefore, the polyamide resin used in the present invention preferably has proton in the carbon atom on the principal chain adjacent to the N atom of the amide bond.

The polymeric reaction for grafting is conducted by dissolving the polyamide resin as the principal chain and the monomer as the graft component in a solvent in which both the polyamide resin and the graft component are soluble, and adding to the solution a radical initiator such as azobisisobutyronitrile (AIBN), benzoyl peroxide or the like or, alternatively, an ion polymerization initiator such as metallic Na, whereby a grafted polyamide resin is synthesized.

Preferably, the grafted polyamide after the synthesis is subjected to a refining step such as precipitation or rinsing, in order to remove any impurity such as the residue of the initiator.

An example of a synthesis of the resin [3] used as the grafted polyamide resin is shown below.

Synthesis Example

The following components were dissolved in 120 g of methanol: 10.2 g of nylon 6, nylon 12, nylon 6-6, nylon 6-10 copolymer nylon (weight composition ratio: 6/12/6-6/6-10 =2/1/2/2, mean molecular weight 140,000); 4.3 g of acrylamide; and 0.0002 g of AIBN. The solution was heated and stirred for 3 hours to cause a grafting reaction. The reacted mixture was cooled to room temperature and was diluted with 160 g of methanol. The diluted solution was dripped into a mixed solvent composed of 2.0 kg of methylethylketone (MEK) and 1.2 kg of n-hexane, whereby a white precipitate of grafted polyamide was obtained. The precipitate was filtered and then separated after three of washings with 600 g of MEK, followed by 6-hour drying at a reduced pressure at 35° C., whereby 13.1 g of the resin [3] was obtained.

The intermediate layer of the invention may be formed of the above-mentioned grafted polyamide resin alone or, alternatively, a suitable system is obtained by adding another resin or additive as the material of the intermediate layer. Examples of the resin which can suitably be added are a copolymer nylon, a polyamide, such as N-alkoxymethylated nylon, polyamide resin, polyester resin, polyurethane resin, polyurea resin and phenol resin. Examples of the additive are powders of silicone resin, a surfactant, a silicone leveling agent, silane coupler and titanate coupler.

The electrophotographic photosensitive member of the present invention has a layered structure with the above-mentioned intermediate layer spaced between a photosensitive layer 1 and a conductive substrate 3 as shown in FIG. 1.

The thickness of the intermediate layer is determined by considering any defect in the substrate, as well as electrophotographic characteristics. In general, however, the thickness preferably ranges between 0.1 and 50 $\mu$m, more preferably between 0.5 and 5 $\mu$m. The application of solution for forming the intermediate layer may be effected by a dip coating, spray coating and roll coating.

According to the invention, the photosensitive layer may be of a single-layer type or a laminated type having layers of different functions; namely, a charge generating layer and a charge transporting layer.

When the laminated type structure is used, the charge generating layer can be formed by dispersing a charge generating substance in a binding resin and applying the dispersion liquid on the intermediate layer. Examples of such a charge generating substance are an azo pigment such as sudan red of dian blue, a quinone pigment such as pyrene quinone or anthanthrone, a quinocyanine pigment, a perylene pigment, an indigo pigment such as indigo or thioindigo, an arsenium salt pigment, and a phthalocyanine pigment such as copper phthalocyanine and alumichloro phthalocyanine. Examples of the bonding resin suitably used are polyvinyl butyral, polystyrene, polyvinyl acetate, acrylic resin, polyvinyl pyrolidone, ethyl cellulose and cellulose acetate butyrate. The thickness of the charge generating layer thus formed is preferably not greater than 5 $\mu$m, more preferably between 0.05 and 2 $\mu$m.

The charge transporting layer on the charge generating layer can be formed by applying a liquid formed by dissolving a charge transporting substance in a film-forming resin, because the charge transporting substance usually has a small molecular weight and, hence, exhibits a small film formability. Examples of the charge transporting substances are a polycyclic aromatic compound having, in the principal or side chain, a structure such as biphenylene, anthracene, pyrene or phenanthrene, a nitrogen-containing cyclic compound such as indole, carbazole, oxidiazole or pyrazole, a hydrazone compound and a styryl compound.

Examples of the film-forming resin are polyester, polycarbonate, polymethacrylic acid ester, polystyrene and so forth.

The thickness of the charge transporting layer preferably ranges between 5 and 50 $\mu$m, more preferably, between 10 and 30 $\mu$m.

The charge transporting layer maybe formed under the charge generating layer.

A photosensitive layer of the single-layer type can be formed by simultaneously dissolving both the charge generating substance and the charge transporting substance in a suitable binder resin to form a solution and applying this solution to the intermediate layer. In this case, the thickness of the photosensitive layer preferably ranges between 8 and 50 $\mu$m, more preferably between 10 and 40 $\mu$m.

According to the invention, it is also possible to use other types of photosensitive layers such as an organic photoconductive polymer layer such as of polyvinyl carbazole, polyvinyl anthracene or the like, an Se evaporation layer, an Se-Te evaporation layer on an .a-Si layer.

It is possible to provide a protective layer on the photosensitive layer for the purpose of improving the durability.

The substrate used in the invention may be of any type, provided that it has an electrical conductivity. For instance, it is possible to use a metal such as aluminum, copper, chromium, nickel, zinc or stainless steel formed into a drum or a sheet, a laminate structure formed by laminating a metal foil such as of aluminum or copper on a plastic film, a film produced by forming a film of aluminum, indium oxide and tin oxide on a plastic film, or a sheet of metal, plastic or paper on which a conductive layer is formed by application of a conductive material with or without a suitable binder resin. The above-mentioned conductive layer can be formed from a powder, foil or short fibers of a metal such as aluminum, copper, nickel or silver; a conductive metal oxide such as antimony oxide, indium oxide or tin oxide; a polymeric conductive material such as polypyrrole, polyaniline or a molecular electrolyte; carbon fiber, carbon black or graphite powder coated with one of the above-mentioned conductive substance.

Examples of the binder resin suitable for use in forming the above-mentioned conductive layer are thermoplastic resins such as polyamide, polyester, acrylic resin, polyamino acid ester, polyvinyl acetate, polycarbonate, polyvinyl formal, polyvinyl butyral, polyvinyl alkyl ether, polyalkylene ether, and thermosetting resins such as thermosetting polyurethane, phenol resin and epoxy resin.

The mixing ratio of the conductive substance to the binder resin by weight preferably ranges between 10:1 and 1:10, and more preferably between 5:1 and 1:5. The mixing ratio is determined after due consideration of the resistance value, surface condition and application characteristic of the solution to be applied.

When the conductive substance is in the form of a powder, such a powder can be prepared by any ordinary method by means of a ball mill, sand mill or the like.

It is also possible to add other types of additives such as a surfactant, silane coupler, titanate coupler, silicone oil and silicon leveling agent.

The intermediate layer with grafted polyamide resin of the photosensitive member of the present invention may be made electrically conductive by addition of a conductive substance. It such a case, the conductive substances, mixing ratio between the conductive substance and the resin, preparation method and the additives which can be added may the same as those for the conductive layer mentioned above.

The substrate need not be conductive when such a conductive intermediate layer is used.

Furthermore, in order to facilitate control of characteristics such as the barrier characteristic, a second intermediate layer, made mainly of a resin, may be provided on the above-mentioned intermediate layer.

Examples of the resin suitably used as the material of the second intermediate layer are polyamide, polyester, polyurethane, polyurea and phenol resin. Preferably, the thickness of this second intermediate layer ranges between 0.1 and 5 μm.

The electrophotographic photosensitive member of the present invention is adaptable to various types of electrophotographic apparatus such as a copying machine, a laser printer, an LED printer, a liquid crystal shutter printer and so forth, and finds a wider use in various fields of technology making use of electrophotographic techniques, such as display, recording, simple printing, plate making, facsimile and so on.

Figure 2:
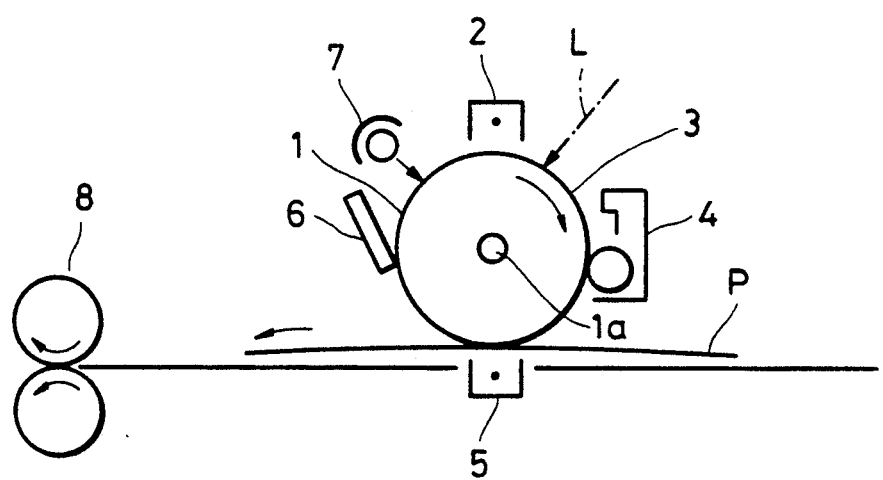
FIG. 2 is a schematic illustration of an electrophotographic apparatus which makes use of an electrophotographic photosensitive member of the present invention.

FIG. 2 schematically shows an ordinary transfer-type electrophotographic apparatus which makes use of the electrophotographic photosensitive member of the present invention.

Referring to this FIGURE, the apparatus has a drum-type photosensitive member 1 serving as an image carrier. The photosensitive member 1 is adapted to be rotatingly driven at a constant peripheral speed in the direction of an arrow about the axis 1a. During the rotation, the photosensitive member 1 is uniformly charged at its surface to a predetermined positive or negative potential by a charging device 2 and is then exposed to an image exposure light L by a suitable exposure device (not shown) such as a slit exposure device or a laser beam scanning exposure device at an exposure section 3, whereby an electrostatic latent image corresponding to the exposure image is progressively formed on the peripheral surface of the photosensitive member.

The electrostatic latent image is then developed with a toner by a developing device 4 and the thus formed toner image is progressively transferred by a transfer device 5 onto a transfer member P which is fed into the gap between the photosensitive member 1 and the transfer member 5 in synchronization with the rotation of the photosensitive member.

The transfer member P to which the image has been transferred is then separated from the surface of the photosensitive member and is introduced into an image fixing device 8 where the transferred image is fixed. The transfer member with the image fixed thereon is then discharged to the outside of the apparatus as a copy.

A cleaning device 6 then removes any residual toner form the surface of the photosensitive member 1 so that the surface is cleaned. The surface of the photosensitive member is then uniformly charged by the charging device 2 to prepare for the subsequent copying cycle.

A corona charger is broadly used as the charging means 2 which uniformly charged the surface of the photosensitive member 1. The transfer device 5 also employs a corona transfer device in most cases.

The described electrophotographic apparatus may be constructed such that two or more components or devices are constructed as a unit which is demountable from the main part of the apparatus. For instance, it is possible to construct the photosensitive member 1 and the cleaning device 6 as a unit which can be mounted to and demounted from the main part of the apparatus with the aid of a suitable guide means such as rails. In such a case, the charging device and/or the developing device may be provided on the above-mentioned unit.

When the electrophotographic apparatus is used as a copying machine or a printer, the image exposure light L for the exposure may be a light reflected by, or transmitted through, an original, or may be a scanning laser beam modulated in accordance with a signal formed by reading the original. The exposure light L also may be a light formed by a light-emitting diode array or a liquid crystal shutter array which is driven in accordance with the signal formed as a result of reading the original.

Figure 3:
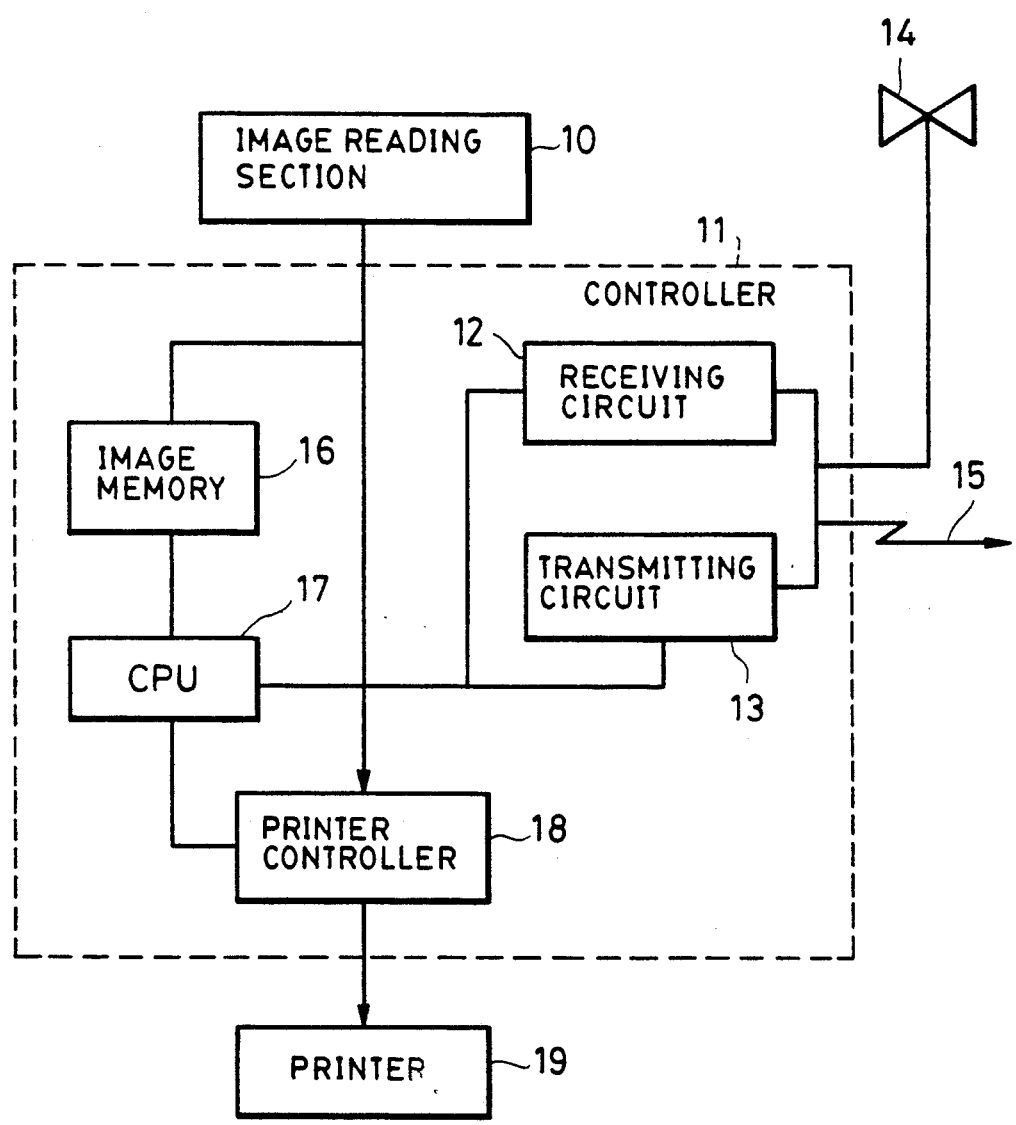
FIG. 3 is a block diagram of a facsimile apparatus having an electrophotographic apparatus used as a printer.

When the electrophotographic apparatus is used as a a facsimile printer, the image exposure light L is controlled in accordance with data received by the facsimile so that the received data is printed. FIG. 3 is a block diagram of the electrophotographic apparatus used as the printer of a facsimile machine.

The controller 11 operates image reading section 10 and printer 19. The controller 11 itself is under the control of CPU 17. The data read by image reading section 10 is transmitted to another station through transmission circuit 13. The data received from the transmitting station is delivered to printer 19 through receiving circuit 12. The received image data is stored in image memory 16. A printer controller 18 controls the operation of printer 19. Numeral 14 denotes a telephone.

An image received from line 15, i.e., image formation from a remote terminal connected through the line, is demodulated by receiving circuit 12 and is then delivered to CPU 17 which conducts decoding of the image information, and the decoded image information is successively stored in image memory 16. After storage of the image in an amount of at least one (1) page in memory 16, the CPU commences an operation for recording the image of this page. Namely, CPU 17 reads the image information of one page from image memory 16 and delivers the decoded image information of one page to printer controller 18. Upon receipt of the one-page image information from CPU 17, printer controller 18 controls printer 19 to enable printer 19 to print the one-page image information. During the printing, the CPU is in receipt of the image information of the next page. The receiving and recording of image are thus performed by printer 19.

The following Examples represent certain preferred embodiments of the present invention.

EXAMPLES

Example 1

A mixture was formed from the following components: 50 parts of conductive titanium oxide powder coated with tin oxide containing 10% of antimony oxide; 25 parts of phenol resin; 20 parts of methyl cellosolve; 5 parts of methanol; and 0.002 parts of silicone oil (polydimethylsiloxane-polyoxyalkylene copolymer, weight mean molecular weight 3000). The mixture was dispersed for 2 hours in a sand mill using glass beads of 1 mm diameter, whereby a coating material for forming a conductive layer was prepared.

The above-mentioned coating material was applied on the surface of an aluminum cylinder (30 mm diameter and 260 mm long) by dip coating, followed by 30-minute drying at 140° C., whereby a conductive layer of 20 μm was formed.

Subsequently, 5 parts of the resin [3] mentioned above was dissolved in 95 parts of methanol, whereby the coating material for forming an intermediate layer was prepared. This coating material was applied by dip coating on the above-mentioned conductive layer, followed by 20-minute drying at 120° C., whereby an intermediate layer of 0.6 μm was formed.

Meanwhile, a material for a charge generating layer was prepared by the following process. A mixture was formed from 3 parts of a disazo pigment having a composition expressed by the following formula, 2 parts of polyvinyl benzal (benzal ratio 80%, weight mean molecular weight 11.000) and 35 parts of cyclohexanone.

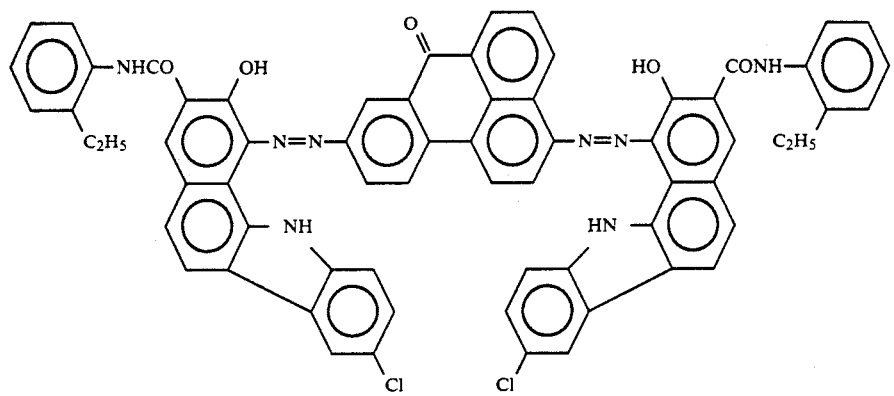

The mixture was then dispersed for 12 hours in a sand mill using glass beads of 1 mm diameter. Then, 60 parts of methylethylketone (MEK) was added to the dispersed material, whereby a dispersion liquid as the material of the charge generating layer was prepared. The thus prepared dispersion liquid was applied by dip coating on the above-mentioned intermediate layer followed by 20-minute drying at 80° C., whereby a charge generating layer of 0.2 μm was obtained.

Subsequently, 10 parts of a styryl compound having a composition expressed by the following formula and 10 parts of polycarbonate (weight mean molecular weight 46,000) were dissolved in a mixture solvent formed of 20 parts of dichloromethane and 40 parts of monochlorobenzene to form a solution.

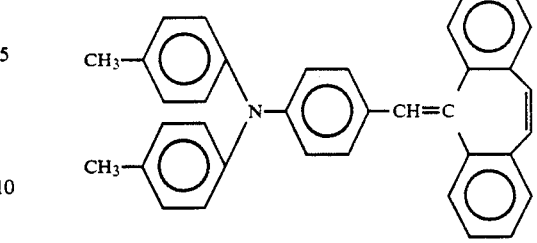

The mixture was applied by dip coating on the above-mentioned charge generating layer, followed by 60-minute drying at 120° C., whereby a charge transporting layer of 18 μm thick was obtained.

The electrophotographic photosensitive member of the invention thus produced was tested on a inversion-developing type laser printer which is capable of cyclically performing a process including the steps of charging, exposure, development, transfer and cleaning at a cycle time of 1.5 seconds. The test was conducted at an exposure rate adjusted to 1.7 μJ/cm², both in an environment of normal temperature and normal humidity (23° C., 50% RH) and an environment of high temperature and high humidity (30° C., 85% RH), and the test results were evaluated.

As will be understood from Table 2 showing the test results, the photosensitive member of Example 1 showed a large difference between the dark potential ($V_D$) and bright potential ($V_L$), thus proving a good image contrast. In addition, the dark potential ($V_D$) was stable even at high temperature and high humidity, thus ensuring good quality of the copy image without any defect such as black spots and fog.

EXAMPLES 2 TO 5

In Examples 2, 3, 4 and 5 electrophotographic photosensitive members were prepared by the same process as in Example 1 except that resins [4], [7], [14] and [34] were used in place of resin [3] as the material of the intermediate layer, respectively, and each such member was tested and evaluated in the same way as Example 1. All such Examples 2 to 5 showed stable dark potential ($V_D$), as well as good image quality without any fog. The results of tests employing these Examples is also shown in Table 2.

Comparison Example 1

An electrophotographic photosensitive member (as Comparison Example 1) was produced by the same process as Example 1, except that the intermediate layer was formed of N-methoxymethylated nylon 6 (weight mean molecular weight 150,000, methoxymethyl substitution ratio 28%), and thus produced photosensitive member was tested and evaluated in the same way as Example 1. In this case, chargeability was impaired at conditions of high temperature and high humidity so that the dark potential ($V_D$) was lowered in such environment, and black spots were observed on the copied image. The results of the test of Comparison Example 1 also are shown in Table 2.

Comparison Example 2

An electrophotographic photosensitive member (as Comparison Example 2) was produced by the same process as Example 1 except that the intermediate layer was formed of polyacrylamide (weight mean molecular weight 240,000, methoxymethyl substitution ratio 28%), and thus produced photosensitive member was tested and evaluated in the same way as Example 1. In this case, chargeability was impaired at conditions of high temperature and high humidity so that the dark potential ($V_D$) was lowered in such environment, and fog was observed over the entire area of the copy image. The results of the test of Comparison Example 2 also are shown in Table 2.

TABLE 2

|  | 23° C., 50% RH | | 30° C., 85% RH | |
|---|---|---|---|---|
|  | Dark potential $V_D$(-V) | Bright potential $V_L$(-V) | Dark potential $V_D$(-V) | Image quality |
| Ex. 1 | 690 | 160 | 690 | Good |
| Ex. 2 | 700 | 155 | 695 | Good |
| Ex. 3 | 675 | 175 | 670 | Good |
| Ex. 4 | 680 | 150 | 670 | Good |
| Ex. 5 | 660 | 180 | 660 | Good |
| Comp. Ex. 1 | 670 | 170 | 620 | Black spots |
| Comp. Ex. 2 | 650 | 155 | 385 | Fog over whole area |

Example 6

5 parts of the resin [5] were dissolved in 95 parts of methanol so as to form a coating material for the intermediate layer. The coating material was applied by dip coating to the surface of an aluminum cylinder of 30 mm diameter and 360 mm long, followed by 15-minute drying at 100° C., whereby the intermediate layer of 1.2 μm thick was obtained.

Then, 4 parts of disazo pigment having a composition expressed by the following formula, 2 parts of polyvinylbutyral (butyralation rate 86%, weight mean molecular weight 24,000) and 34 parts of cyclohexane were dispersed for 12 hours in a sand mill using glass beads of 1 mm diameter. Then, 60 parts of tetrahydrofuran (THF) was added to the dispersed material, whereby a dispersion liquid for the charge generating layer was obtained.

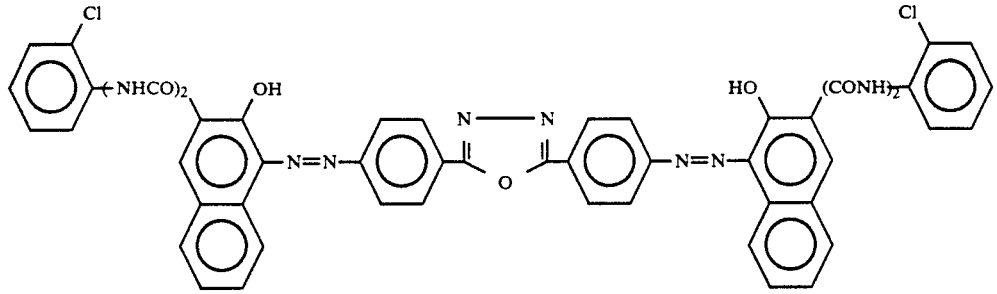

The dispersion liquid was then applied by dip coating on the intermediate layer, followed by 15-minute drying at 80° C., whereby a charge generating layer of 0.15 μm was formed.

Then, 10 parts of the styryl compound used in Example 1 and 10 parts of polycarbonate (weight mean molecular weight 63000) were dissolved in a mixture solvent formed of 15 parts of dichloromethane and 45 parts of monochlorobenzene, and the thus formed solution was applied by dip coating onto the above-mentioned charge generating layer followed by 60 minute drying at 120° C., whereby a charge transporting layer of 25 μm thick was obtained.

The electrophotographic photosensitive member thus produced was tested on a copying machine which cyclically performs a process having the steps of charging, exposure (exposure rate 2.2 lux.sec), development, transfer and cleaning at a cycle time of 0.6 sec.

The electrophotographic characteristics of this photosensitive member were examined under conditions of low humidity and low temperature (15° C., 15% RH), the results being shown in Table 3. As will be seen from this Table, the photosensitive member of Example 6 showed a large difference between the dark potential ($V_D$) and bright potential ($V_L$), thus proving sufficiently large contrast. NO rise in the bright potential ($B_L$) was observed and stable image quality was confirmed even after continuous production of 1000 copies.

Examples 7 to 10

In Examples 7, 8, 9 and 10 electrophotographic photosensitive members were prepared by the same process as in Example 6, except that resins [10], [16], [27] and [32] were used in place of the resin [3] as the material of the intermediate layer, respectively, and all members were tested and evaluated in the same way as Example 6. All such Examples 2 to 5 showed a large difference between the dark potential ($V_D$) and bright potential ($V_L$), thus proving sufficiently large contrast. No substantial rise in the bright potential ($B_L$) was observed and stable image quality was confirmed even after continuous production of 1,000 copies. The results of testing Examples 7 to 10 are also shown in Table 3.

Comparison Example 3

An electrophotographic photosensitive member Comparison Example 3) was produced by the same process as Example 6, except that the intermediate layer was formed of an alcohol-soluble copolymer nylon (weight mean molecular weight 78,000, and the thus produced photosensitive member was tested and evaluated in the same way as in Example 6. In this case, the bright potential ($V_1$) was raised during continuous production of 1000 copies and a fog was observed on the copy image after production of the 1,000 copies. The results of testing this comparison example also are shown in Table 3.

TABLE 3

|  | 23° C., 50% RH | | After production of 1000 copies | |
| --- | --- | --- | --- | --- |
|  | Dark potential $V_D$(-V) | Bright potential $V_L$(-V) | Bright potential $V_D$(-V) | Image quality |
| Ex. 6 | 665 | 195 | 200 | Good |
| Ex. 7 | 670 | 190 | 195 | Good |
| Ex. 8 | 680 | 210 | 220 | Good |
| Ex. 9 | 650 | 205 | 210 | Good |
| Ex. 10 | 675 | 200 | 215 | Good |
| Comp. Ex. 3 | 650 | 205 | 325 | Fogging |

EXAMPLE 11

A mixture was formed from 30 parts of powder of conductive titanate oxide coated with tin oxide containing 10% of antimony oxide, 20 parts of powder of rutile-type titanium oxide, 20 parts of the aforementioned resin [3],20 parts of methanol and 10 parts of 2-propanol. The mixture was dispersed for 1 hour in a sand mill employing glass beads of 1 mm diameter, whereby a conductive material for the intermediate layer was prepared. This material was applied by dip coating to the surface of an aluminum cylinder of 60 mm diameter and 260 mm long, followed by 30-minute drying at 160° C., whereby an intermediate layer of 16 μm was formed.

Then, a coating material for a second intermediate layer was prepared by dissolving 5 parts of an alcohol-soluble copolymer nylon (weight mean molecular weight 75,000) in 95 parts of methanol. This material was applied by dip coating to the above-mentioned intermediate layer, followed by 10-minute drying at 80° C., whereby a second intermediate layer of 0.3 μm thick was obtained.

Then, a mixture was formed from 2 parts of a disazo pigment having a composition expressed by the following formula, 1 part of polyvinyl butyral (butyralation ratio 72%, weight mean molecular weight 180,000) and 30 parts of cyclohexanone.

The mixture was dispersed for 20 hours in a sand mill using glass beads of 1 mm diameter. Then, 65 parts of methylethylketone (MEK) was added to the dispersed material, whereby a dispersion liquid as a material of a charge generating layer was obtained. This dispersion liquid was applied by dip coating to the above-mentioned second intermediate layer, followed by 20-minute drying at 80° C., whereby a charge generating layer of 0.2 μm thick was obtained.

Then, 10 parts of a hydrazone compound having a composition expressed by the following formula and 10 parts of polycarbonate (weight mean molecular weight 46,000) were dissolved in a mixed solvent formed of 20 parts of dichloromethane and 40 parts of monochlorobenzene.

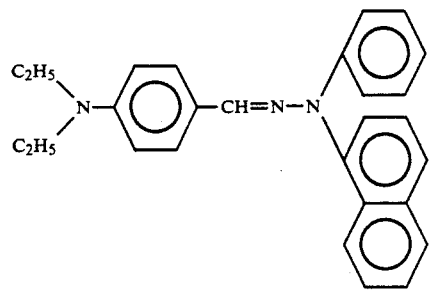

The thus formed solution was applied by dip coating to the above-mentioned charge generating layer, followed by 60-minute drying at 120° C., whereby a charge transporting layer 23 μm thick was obtained.

The thus produced electrophotographic photosensitive member was tested on a copying machine capable of cyclically performing a process including the steps of charging, exposure (exposure rate 2.8 lux·sec), development, transfer and cleaning at a cycle time of 0.8 second.

Electrophotographic characteristics of this photosensitive member were examined and evaluated under conditions of low temperature and low humidity (10° C., 10% RH), the results being shown in Table 4. As will be seen from this Table, the photosensitive member of Example 11 showed a large difference between the dark potential ($V_D$) and the bright potential ($V_L$), thus providing a sufficiently large contrast, No rise in the bright potential ($V_L$) was observed and stable image quality was confirmed even after continuous production of 1000 copies.

Example 12

An electrophotographic photosensitive member (Example 12) was produced by forming a conductive intermediate layer, charge generating layer and a charge transporting layer in the same manner as in Example 11, except that the second intermediate layer was omitted.

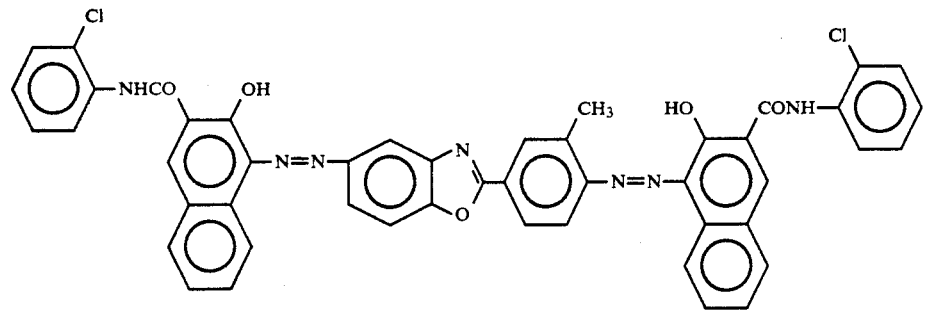

The electrophotographic photosensitive member was tested and evaluated in the same way as Example 11. The photosensitive member of Example 12 shows a large difference between the dark potential ($V_D$) and the bright potential ($V_L$), thus providing sufficiently large contrast. No substantial rise in the bright potential ($V_L$) was observed and stable image quality was confirmed even after continuous production of 1,000 copies. The results are shown in Table 4.

Comparison Examples 4 and 5

Electrophotographic photosensitive members (as Comparison Examples 4 and 5) were respectively formed by the same processes as Examples 11 and 12, except that phenol resin was used as the resin of the material of the intermediate layer containing conductive titanium oxide powder and rutile-type titanium oxide film. The members were tested and evaluated in the same way as Example 11. The photosensitive member of Comparison Example 4 showed a rise in the bright potential ($V_L$) and a fog on the copy image after continuous production of 1000 copies. Comparison Example 5, in which the photosensitive layer composed of the charge generating and charge transporting layers was formed directly on the intermediate layer, could not provide a potential contrast necessary for image formation, due to a low dark potential ($V_D$) caused by injection of a large quantity of charges from the substrate, as a result of insufficient barrier effect attributable to omission of the second intermediate layer. The results of tests on these Comparison Examples also are shown in Table 4.

TABLE 4

| | Second inter-mediate layer | 23° C., 50% RH | | After production of 1000 copies | |
|---|---|---|---|---|---|
| | | Dark potential $V_D$(-V) | Bright potential $V_L$(-V) | Bright potential $V_D$(-V) | Image quality |
| Ex. 11 | Exists | 685 | 185 | 190 | Good |
| Ex. 12 | Omitted | 670 | 185 | 185 | Good |
| Comp. Ex. 4 | Exists | 660 | 190 | 285 | Fogging |
| Comp. Ex. 5 | Omitted | 305 | 110 | Evaluation impossible | Evaluation impossible |

Examples 13 and 14

Electrophotographic photosensitive members as (Examples 13 and 14) were produced by the same process as in Example 1 except that resins [33] and [35] were used as the material of the intermediate layer. Such members were tested and examined in the same way as Example 1. Both these Examples showed high degrees of stability of the dark potential ($V_D$), as well as good images without any defects, such as black spots and fog. The results of the test on Examples 14 and 15 are shown in Table 5.

TABLE 5

| | 23° C., 50% RH | | 30° C., 85% RH | |
|---|---|---|---|---|
| | Dark potential $V_D$(-V) | Bright potential $V_L$(-V) | Dark potential $V_D$(-V) | Image quality |
| Ex. 11 | 675 | 205 | 670 | Good |
| Ex. 12 | 685 | 195 | 675 | Good |

What is claimed is:

1. An electrophotographic photosensitive member comprising a substrate, a photosensitive layer and an intermediate layer spaced between said substrate and said photosensitive layer, wherein said intermediate layer contains a polyamide resin grafted with a polymer or a copolymer, said polymer or copolymer having a unit component represented by the following general formula (I)

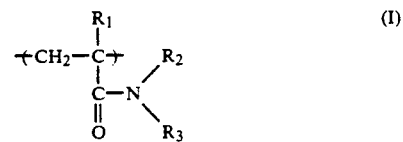

wherein, $R_1$ is hydrogen atom or a methyl group, $R_2$ and $R_3$ each is hydrogen atom, an alkyl group or an aryl group or $R_2$ and $R_3$ in combination is a residual group necessary for forming a heterocyclic compound containing N, wherein $R_2$ and $R_3$ are the same or different from each other.

2. An electrophotographic photosensitive member according to claim 1, wherein said substrate comprises a base substrate and a conductive layer formed on said base substrate.

3. An electrophotographic photosensitive member according to claim 1, wherein said intermediate layer contains a conductive substance and wherein a second intermediate layer comprising a resin is provided between said intermediate layer and said photosensitive layer.

4. An electrophotographic photosensitive member according to claim 1, wherein said unit component expressed by said formula (I) is contained in the graft side chain of the grafted polyamide resin in an amount which is at least 50 mol %.

5. An electrophotographic photosensitive member according to claim 1, wherein said unit component expressed by said formula (I) is contained in the graft side chain of the grafted polyamide resin in an amount which is at least 70 mol %.

6. An electrophotographic photosensitive member according to claim 1, wherein the content of the graft portion of the grafted polyamide resin ranges between 10 and 70 wt %.

7. An electrophotographic photosensitive member according to claim 1, wherein the content of the graft portion of the grafted polyamide resin ranges between 15 and 50 wt %.

8. An electrophotographic photosensitive member according to claim 1, wherein said photosensitive layer contains an organic photoconductive substance.

9. An electrophotographic photosensitive member according to claim 1, wherein said photosensitive layer includes a charge generating layer containing a charge generating substance and a charge transporting layer containing a charge transporting substance.

10. An electrophotographic apparatus comprising an electrophotographic photosensitive member having a substrate, a photosensitive layer and an intermediate layer spaced between said substrate and said photosensitive layer, wherein said intermediate layer contains a polyamide resin grafted with a polymer or a copolymer, said polymer or copolymer having a unit component represented by the following general formula (I)

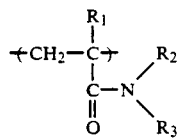

wherein, $R_1$ is hydrogen atom or a methyl group, $R_2$ and $R_3$ are each hydrogen atom, an alkyl group or an aryl group and $R_2$ and $R_3$ in combination represent a residual group necessary for forming a heterocyclic compound containing N, wherein $R_2$ and $R_3$ are the same or different from each other.

11. A facsimile apparatus comprising:
  (a) an electrophotographic apparatus including an electrophotographic photosensitive member having a substrate, a photosensitive layer and an intermediate layer spaced between said substrate and said photosensitive layer, wherein said intermediate layer contains a polyamide resin grafted with a polymer or a copolymer, said polymer or copolymer having a unit component expressed by the following general formula (I)

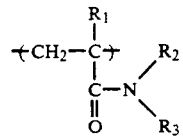

wherein, $R_1$ is hydrogen atom or a methyl group, $R_2$ and $R_3$ are each hydrogen atom, an alkyl group or an aryl group or $R_2$ and $R_3$ in combination is a residual group necessary for forming a heterocyclic compound containing N, wherein $R_2$ and $R_3$ are the same or different from each other; and (b) receiving means for receiving image information from a remote terminal.

* * * * *

UNITED STATES PATENT AND TRADEMARK OFFICE
CERTIFICATE OF CORRECTION

PATENT NO. : 5,071,723

DATED : December 10, 1991

INVENTOR(S) : TAKASHI KOYAMA, ET AL.

It is certified that error appears in the above-identified patent and that said Letters Patent is hereby corrected as shown below:

Title Page:

IN [57] ABSTRACT

Line 5, after "formula (I) "N," should read --N;--.

COLUMN 1

Line 10, "U" should be deleted.

COLUMN 3

Line 5, "pyrrolidone" should read --pyrrolidine--.
Line 18, "includes" should read --include--.
Line 25, "includes" should read --include--.

COLUMN 7

Line 52, "polymer." should read --polymer,--.

COLUMN 8

Line 44, "the" (first occurrence) should be deleted.

COLUMN 9

Line 15, "of" should be deleted.

COLUMN 10

Line 14, "maybe" should read --may be--.
Line 52, "substance." should read --substances.--.

UNITED STATES PATENT AND TRADEMARK OFFICE
CERTIFICATE OF CORRECTION

PATENT NO. : 5,071,723
DATED : December 10, 1991
INVENTOR(S) : TAKASHI KOYAMA, ET AL.

It is certified that error appears in the above-identified patent and that said Letters Patent is hereby corrected as shown below:

COLUMN 11

Line 67, "form" should read --from--.

COLUMN 13

Line 14, "was" should read --were--.
   Line 56, "was" should read --were--.

COLUMN 15

Line 38, Close up right margin.
   Line 39, Close up left margin.

COLUMN 16

Line 47, "NO" should read --No--.

Signed and Sealed this

Twenty-fifth Day of May, 1993

Attest:

MICHAEL K. KIRK

Attesting Officer     Acting Commissioner of Patents and Trademarks